(12) United States Patent
Bakker et al.

(10) Patent No.: US 8,737,236 B2
(45) Date of Patent: May 27, 2014

(54) METHOD FOR DETECTING PCI COLLISIONS

(75) Inventors: Hajo Bakker, Eberdingen (DE); Anton Ambrosy, Tiefenbronn (DE); Rolf Sigle, Remshalden (DE); Danish Aziz, Zuffenhausen (DE); Harald Eckhardt, Stuttgart (DE)

(73) Assignee: Alcatel Lucent, Paris (FR)

( * ) Notice: Subject to any disclaimer, the term of this patent is extended or adjusted under 35 U.S.C. 154(b) by 177 days.

(21) Appl. No.: 13/380,645

(22) PCT Filed: Jun. 23, 2010

(86) PCT No.: PCT/EP2010/058925
§ 371 (c)(1),
(2), (4) Date: Dec. 23, 2011

(87) PCT Pub. No.: WO2010/149709
PCT Pub. Date: Dec. 29, 2010

(65) Prior Publication Data
US 2012/0099442 A1 Apr. 26, 2012

(30) Foreign Application Priority Data
Jun. 26, 2009 (EP) .................................... 09290493

(51) Int. Cl.
*H04L 12/26* (2006.01)
(52) U.S. Cl.
USPC ........................................................ 370/242
(58) Field of Classification Search
USPC ............... 370/242; 455/436, 437, 438, 67.14, 455/456.1
See application file for complete search history.

(56) References Cited

U.S. PATENT DOCUMENTS

| 2009/0239533 A1* | 9/2009 | Somasundaram et al. ..... 455/434 |
| 2010/0297955 A1* | 11/2010 | Marinier et al. ................ 455/73 |
| 2010/0323633 A1* | 12/2010 | Pani et al. .................. 455/67.14 |
| 2010/0323718 A1* | 12/2010 | Jen ............................. 455/456.1 |
| 2011/0237258 A1* | 9/2011 | Nylander et al. ............. 455/437 |
| 2011/0263282 A1* | 10/2011 | Rune et al. .................... 455/507 |
| 2012/0165020 A1* | 6/2012 | Iwamura et al. .............. 455/436 |

OTHER PUBLICATIONS

Qualcomm Europe, "UE-assisted Heuristic Detection of PCT Collision," 3rd Generation Partnership Project (3GPP), 3GPP TSG-RAM WG2 meeting #65bis, R2-092053, XP050339931, 3 pages, Seoul, Korea, Mar. 23-27, 2009.

(Continued)

*Primary Examiner* — Albert T Chou
(74) *Attorney, Agent, or Firm* — Fay Sharpe LLP

(57) ABSTRACT

A computer implemented method of operating a base station of a wireless communication network, wherein the method comprises: comparing a number of missing context release messages (108) with a first criterion; —comparing the error rate of connection reestablishment messages (112) with a second criterion; executing a cell global identity search algorithm (110) if at least one of the first and the second criterion is fulfilled, wherein the cell global identity of at least one cell with the physical cell identity of the cell where the criterion was fulfilled is requested via an automatic neighbor relation measurement, and wherein a conflict of physical cell identities is detected and reported to an information algorithm (116) when for the physical cell identity at least two cell global identities are found; —an information algorithm for informing a central network element (118) and/or at least one base station (120) of the mobile communication network about a conflict of physical cell identities when a conflict of physical cell identities is reported to the information algorithm; and —initiating a reassignment of at least one physical cell identity.

20 Claims, 3 Drawing Sheets

(56) References Cited

OTHER PUBLICATIONS

Qualcomm Europe, "Connected Mode Mobility in the Presence of PCT Confusion," $3^{rd}$ Generation Partnership Project (3GPP), 3GPP TSG-RAM WG3 meeting #63bis, R3-090699, XP050341086, 4 pages, Seoul, Korea, Mar. 23-27, 2009.

Qualcomm Europe, "UE-assisted Heuristic Detection of PCI Collision," $3^{rd}$ Generation Partnership Project (3GPP), 3GPP TSG-RAM WG2 meeting #63bis, R2-085380, 3 pages, Prague, Czech Republic, Sep. 29-Oct. 3, 2008.

International Search Report for PCT/EP2010/058925 dated Jul. 28, 2010.

* cited by examiner

METHOD FOR DETECTING PCI COLLISIONS

FIELD OF THE INVENTION

The present invention relates to a method of detecting a conflict of physical cell identities in wireless communication networks.

BACKGROUND AND RELATED ART

In wireless communication networks, e.g. 3GPP Long Term Evolution networks, every communication cell has a physical cell identity (PCI) and a cell global identity (CGI). While each CGI is dedicated to one single cell the number of PCIs being assigned to wireless communication network cells is limited to 504. So it cannot be excluded that two identical PCIs are selected for two different cells belonging to base stations of the wireless communication network being direct neighbors or being located in a short distance.

When one PCI is assigned to two different cells of the wireless communication network that are direct neighbors or located in a short distance, the communication of mobile devices with the wireless communication network in the proximity of the two cells with the same PCI can be disturbed.

It is therefore an object of the present invention to provide a method for avoiding conflicts of physical cell identities of different mobile communication cells.

SUMMARY OF THE INVENTION

This object is solved by the feature of claim 1. Preferred embodiments of the invention are described by the features of the dependent claims.

The present invention provides a computer implemented method of operating a base station of a wireless communication network. For avoiding conflicts of physical cell identities of different mobile communication cells a plurality of steps is performed as follows:

The number of missing context release messages during a handover procedure is compared with a first criterion. Usually, in the standard of 3GPP Long Term Evolution networks the context release message is a UE (User Equipment) context release message, the UE being preferably a mobile device. Preferably, the first criterion is a first threshold of missing context release messages per a time interval. This is advantageous for detecting if two different cells have the same PCI because during a handover procedure from a serving cell with a different PCI to a first neighbour cell, that is prepared for the handover, having the same PCI as a second neighbour cell, that is not prepared for the handover, the affected mobile device can try to execute a handover to the second neighbour cell because of the PCI conflict so that the context release message from the first neighbour cell is missing in the serving cell.

Cell Global Identities (CGIs) are in 3GPP Long Term Evolution networks unique identifiers for each radio cell of a wireless communication network, Physical Cell Identities (PCIs) are in 3GPP Long Term Evolution networks non-unique identifiers for each radio cell of a wireless communication network.

The error rate of connection re-establishment messages is compared with a second criterion. Preferably, the second criterion is a second threshold of the error rate of connection re-establishment messages. This is advantageous because by analyzing the error rate of connection re-establishment messages a PCI conflict of two different cells can be detected. A connection re-establishment message is sent to a cell when the handover procedure of a mobile device was not successful. For example, a handover procedure of a mobile device is initiated by a serving cell with a different PCI to a first neighbour cell, that is prepared for the handover, with the same PCI as a second neighbour cell, that is not prepared for the handover. Because of the PCI conflict the first cell may be prepared for the handover of the mobile device while the mobile device executes a handover to the second unprepared cell with the same PCI as the first cell. Thus, the mobile device detects a handover failure because the second cell is not prepared for the handover. Then the mobile device sends a connection re-establishment message to the second cell.

If at least one of the first and the second criterion is fulfilled the cell global identity search algorithm is executed. The algorithm requests via an automatic neighbor relation measurement the cell global identity of at least one cell with the physical cell identity of the cell where the criterion was fulfilled. The automatic neighbor relation measurement is performed by at least one mobile device. The at least one mobile device reports the cell global identity of each cell with the physical cell identity requested by the algorithm. If at least two cells with different cell global identities and the same physical cell identity are detected the conflict of physical cell identities is reported to an information algorithm.

The information algorithm informs a central network element and/or at least one base station of the wireless communication network about the conflict of physical cell identities.

A reassignment of at least one physical cell identity is initiated. Preferably, one of the at least two base stations serving the at least two cells with the same physical cell identity changes the physical cell identity of the served cell by picking a new physical cell identity of a range of physical cell identities not including known physical cell identities of cells being located near the cell. Another possibility is that the central network element assigns a new physical cell identity to the cell by avoiding physical cell identities of cells being located near the cell.

In accordance with an embodiment of the invention, the method further comprises receiving the physical cell identities and the cell global identities of the cells served by the neighboring base stations by the base station. Additionally, the physical cell identities and the cell global identities of the cells served by the base station are re ported to at least one neighboring base station of the wireless communication network. Preferably, this can be done via an interface connecting the base stations of the wireless communication network, e.g. X2 interface or an S1 interface, which are standard interfaces in 3GPP Long Term Evolution networks. If two different cells with different cell global identities have the same physical cell identity it is determined if detailed cell information is required. For example, two cells with the same physical cell identity and different cell global identities can be served by two neighboring base stations of the wireless communication network, the distance of the cells being big enough, i.e. the radio coverage areas of these cells do not overlap, to avoid a conflict of the physical cell identities. The detailed information about the cells can help determining if a conflict of physical cell identities exists.

The detailed cell information contains preferably the position and the size of the cell, e.g. in terms of coverage area and main antenna lobe orientation. An unnecessary reassignment of at least one PCI can be avoided when the number of available PCIs is below a third threshold. Based on the detailed cell information a central network element and/or the base stations of the cells with the same PCIs determines if a reassignment of at least one PCI is necessary because of a PCI conflict. An unnecessary reassignment of at least one PCI is avoided when the number of available PCIs is below the third threshold and the detailed cell information indicates that the distance of the corresponding cells is big enough because the low number of available PCI renders a new conflict of PCIs probable.

When the number of available PCIs is above the third threshold no detailed cell in formation is required, a conflict of physical cell identities is reported to the information algorithm in this case.

If detailed cell information is required a message is sent to the base station serving the cell of that detailed cell information is required asking for the detailed cell information. Based on the detailed cell information it is determined if a physical cell identity conflict may exist. If a physical cell identity conflict may exist the cell global identity search algorithm is executed. Alternatively, the detailed cell information is sent by the base station serving the cell which may have a physical cell identity conflict to the neighbour base station without having asked detailed cell information. In this case the neighbour base station is able to determine if a physical cell identity conflict may exist. Finally, the detailed cell information can also be provided by the base stations to the central network element which can decide on a physical cell identity conflict.

In accordance with embodiments of the invention the method further comprises the detection of the loss of connections between the serving base station and a plurality of mobile devices. A loss of connection is detected when no uplink data is received without an initiated handover to a neighboring base station of the wireless communication network. When the number of lost connections fulfills a third criterion a physical cell identity conflict is reported to the information algorithm by the base station. Preferably, the third criterion is a fourth threshold of the number of lost connections between the base station and the plurality of mobile devices.

In accordance with embodiments of the invention the method further comprises requesting an automatic neighbor relation measurement. The automatic neighbor relation measurement is performed by a mobile device of the wireless communication network. The mobile device reports at least the physical cell identity and the cell global identity of the cell which has been specified by the serving cell. When a physical cell identity conflict is detected in the automatic neighbor relation measurement by the first base station the physical cell identity conflict is reported to the information algorithm by the base station.

In accordance with embodiments of the invention the reassignment of at least one physical cell identity is initiated by the central network element.

In accordance with embodiments of the invention the reassignment of at least one physical cell identity is initiated by the base station.

In accordance with embodiments of the invention the base station sends detailed cell information to a different base station that has requested the detailed cell information.

In accordance with embodiments of the invention the base station receives detailed cell information from a different base station that has sent the detailed cell information.

In accordance with embodiments of the invention the central network element receives detailed cell information from base stations that have sent the detailed cell information.

In accordance with embodiments of the invention the central network element is an operation and maintenance node.

A person of skill in the art would readily recognize that steps of various above-described methods can be performed by programmed computers. Herein, some embodiments are also intended to cover program storage devices, e.g., digital data storage media, which are machine or computer readable and encode machine executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

BRIEF DESCRIPTION OF THE DRAWINGS

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Some embodiments of methods and apparatus in accordance with embodiments of the present invention are now described, by way of example only, and with reference to the accompanying drawings, in which.

DETAILED DESCRIPTION OF THE FIGURES

Figure 1:
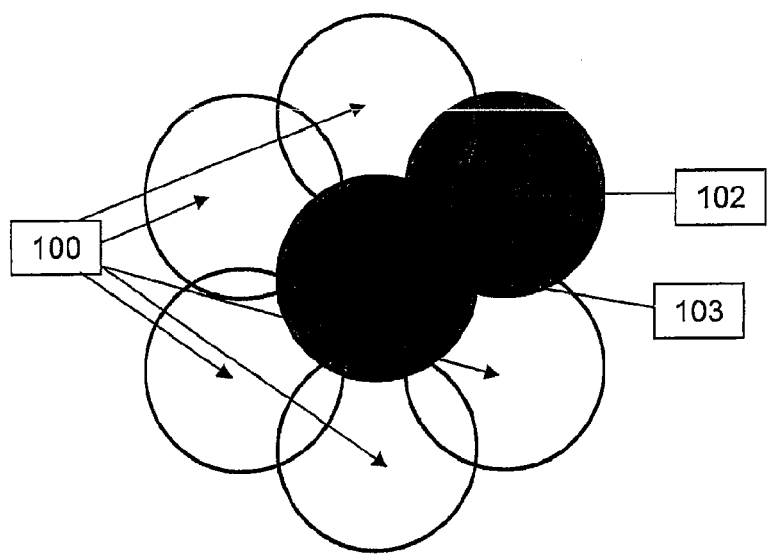
FIG. 1 shows a schematic view of a wireless communication network with a conflict of physical cell identities.

FIG. 1 shows a schematic view of five cells 100 of a wireless communication network, each cell 100 having a different physical cell identity from another cell 100. Further, FIG. 1 shows two neighboring cells 102, 103 of the wireless communication network having the same physical cell identity. When a mobile device is located in the region where the two cells 102, 103 overlap each other the conflict of physical cell identities can lead to a loss of the connection between a base station serving one of the two cells 102, 103 and the mobile device is not able to decode the received information from the base station. Thus, the connection between the serving base station and the mobile device is lost.

Figure 2:
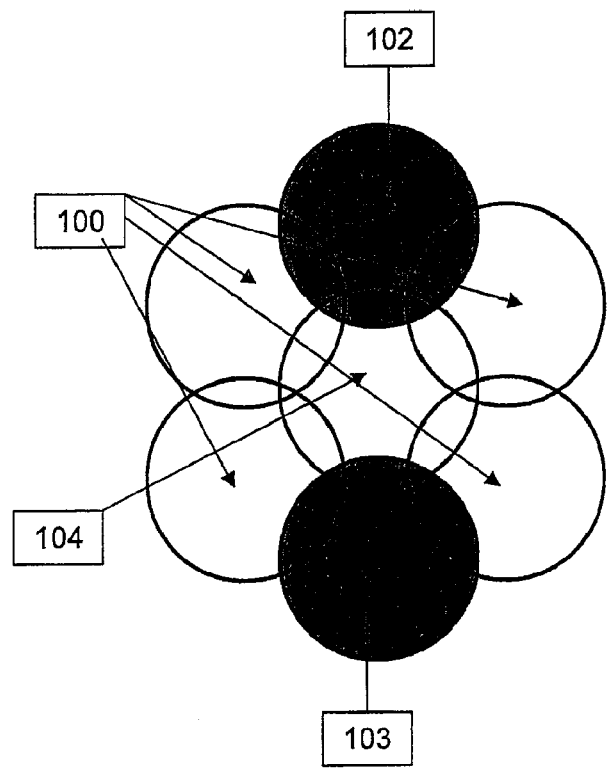
FIG. 2 shows a schematic view of a wireless communication network having a conflict of physical cell identities.

FIG. 2 shows a schematic view of five cells 100 of a wireless communication network, each cell having a different physical cell identity from each other. Two cells 102, 103 belong to the same wireless communication network having the same physical cell identity. The transmission range of the two cells 102, 103 with the same physical cell identity do not overlap each other. The cells 102 and 103 neighbor the cell 104 which has a different PCI.

Because of the conflict of the same PCIs of the cells 102, 103 a handover procedure of a mobile device being located in cell 104 may fail. For example, the handover request is sent from the base station serving cell 104 to the base station serving cell 102 although the handover should be performed to the neighbour cell 103. The decision of the serving base station 104 to send out a handover request is based on the reported PCI from the mobile device. The handover request message is sent to the wrong cell 102 because of the conflict of physical cell identities. Thus, the base station serving the neighbour cell 103 to which the handover should be performed is not prepared to communicate with the mobile device. The base station serving cell 102 acknowledges the handover preparation procedure although the mobile device is not in the transmission range from cell 102. As a result of this PCI conflict a context release message is not sent by the base station serving cell 102 to the base station serving cell 104 and the mobile device sends a connection re-establishment message to the unprepared base station serving neighbour cell 103.

Figure 3:
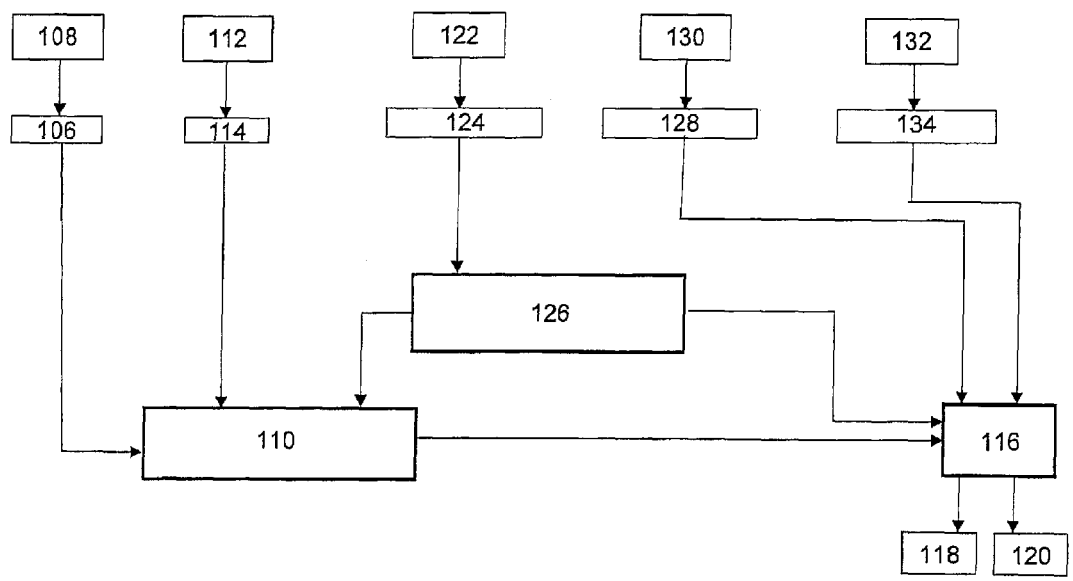
FIG. 3 shows a block diagram of a method for avoiding conflicts of physical cell identities in a wireless communication network.

FIG. 3 shows a block diagram of an embodiment of the invention. In step 106 the number of missing context release messages 108 is compared with a first threshold. When the threshold is reached the cell global identity search algorithm 110 is executed in the serving cell. The error rate of connection re-establishment messages 112 is compared in step 114 with a second threshold. When the second threshold is reached the cell global identity search algorithm 110 is executed in the neighbour cell. Alternatively, the neighbour cell sends a failure indication message to the serving cell to start the cell global identity search algorithm 110 as well in the serving cell.

The cell global identity search algorithm 110 requests from mobile devices the cell global identity of at least one cell with the physical cell identity reported by the steps 106 and/or 114 to the cell global identity search algorithm 110 via an automatic neighbor relation measurement for this physical cell identity. If the cell global identity search algorithm 110 finds two different cell global identities of two different cells with the same physical cell identity a conflict of physical cell identities is reported to the information algorithm 116. The information algorithm 116 informs a central network element 118 and/or the neighbour base stations 120 serving the cells causing the physical cell identity conflict.

The physical cell identities and the cell global identities of the cells served by the neighboring base stations 122 are received by the base station in step 124. In step 124 additionally the physical cell identities and the cell global identities of the neighbouring cells of the served cells of the neighbour base station are reported to the base station of the wireless communication network.

In step 126 it is determined if detailed cell information is required when at least two cells have the same physical cell identity. No additional cell information is required in network configurations where a sufficient number of physical cell identities is available to be assigned to one of the cells causing the physical cell identity conflict. If no detailed cell information is required the physical cell identity conflict is reported to the information algorithm 116.

Detailed cell information is required when the number of available physical cell identities is under a third threshold so that a reassignment of a physical cell identity could cause a new physical cell identity conflict. For avoiding the reassignment of a physical cell identity although there is no physical cell identity conflict, detailed cell information about the cells causing the physical cell identity conflict is requested. The detailed cell information can for example comprise the size and the position of the cell which can be provided in terms of cell type or coverage area, coordinates and main antenna lobe orientation. The detailed cell information is exchanged between the base stations via an X2 or S1 interface. Based on the detailed cell information it is determined if the cell global identity search algorithm 110 is executed.

In step 128 lost connections 130 between the base station and mobile devices are detected. Lost connections can be caused by a physical cell identity conflict. For example, when two neighboring cells have the same physical cell identity, see FIG. 1. If the number of lost connections 130 reaches a fourth threshold the information algorithm 116 is executed.

An automatic neighbor relation measurement 132 is requested in step 134. The automatic neighbor relation measurement is performed by a mobile device that reports every physical cell identity and cell global identity in the transmission range of the mobile device to the base station. When the same physical cell identity is assigned to two cells with different cell global identities a physical cell identity conflict is reported to the information algorithm 116.

Every time the information algorithm 116 is executed the central network element 118 and the base stations serving the cells with the same physical cell identities are informed about a conflict of physical cell identities. When the central network element and the base stations are informed about a conflict of physical cell identities the central network element may decide if a reassignment of a physical cell identity of the cells causing the physical cell identity conflict is performed from the central network element 118 or if the reassignment is performed by one of the base stations 120 serving the cells causing the physical cell identity conflict.

Figure 4:
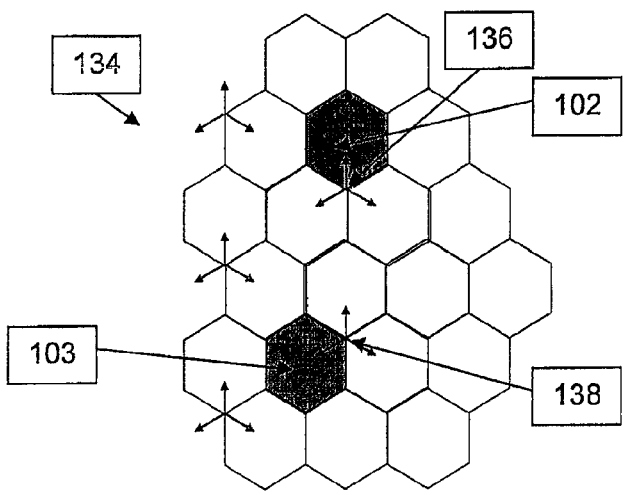
FIG. 4 shows a schematic view of a plurality of cells of a wireless communication network where two cells have the same physical cell identity.

FIG. 4 shows a schematic view of a plurality of cells 134 of a wireless communication network comprising two cells with the same physical cell identity 102 and 103. The two cells 102 and 103 are served by two neighboring base stations 136 and 138. Although two neighboring base stations 136 and 138 serve two cells 102 and 103 with the same physical cell identity it is not mandatory that there exists a conflict of physical cell identities because the distance between the cells 102 and 103 can be big enough to avoid physical cell identity conflicts. If the number of available physical cell identities for a reassignment of the physical cell identity of cell 102 or 103 is below a threshold, detailed cell information of the cells 102 and 103 is required to determine if a conflict of physical cell identities exists. If the number of available physical cell identities is above the threshold a new physical cell identity can be assigned to cell 102 or 103 without requesting detailed cell information.

The detailed cell information comprises information of the size and the position of the cell which can be provided in terms of cell type or coverage area, coordinates and main antenna lobe orientation. Based on this detailed cell information it is determined if a reassignment of a physical cell identity of the cell 102 or 103 is necessary to avoid a physical cell identity conflict. Usually this is the case for small cells or for the deployment of many small cells in an environment of large overlay cells.

Figure 5:
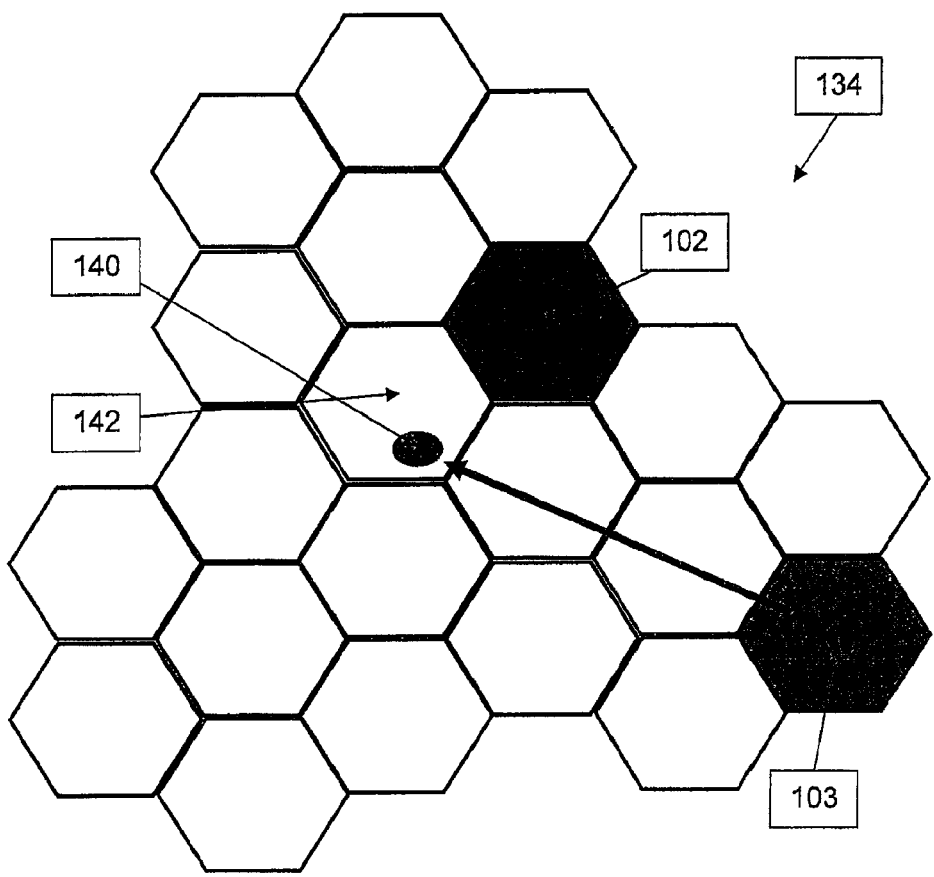
FIG. 5 shows a schematic view of a plurality of cells of a wireless communication network where a hotspot of a cell is located in a non-neighboring cell.

FIG. 5 shows a schematic view of a wireless communication network 134 comprising two cells 102 and 103 with the same physical cell identity. A hotspot 140 of the cell 103 is located in a neighboring cell 142 of cell 102. The hotspot can be caused by real radio conditions in special topological environments. For example, the base station of cell 103 may be located at a hillside such that a hotspot of the cell may be generated on the other side of the valley at another hillside in cell 142.

This hotspot may cause a conflict of physical cell identities although the distance between the cells 102 and 103 seems to be big enough to avoid a conflict of physical cell identities.

This conflict of physical cell identities can be detected by analyzing the handover procedures or the detection of lost connections with mobile devices, see FIG. 3.

LIST OF REFERENCE NUMERALS

100 cell of the wireless communication network
102 cell with the same PCI as 103
103 cell with the same PCI as 102
104 cell located between 102 and 103
106 comparing 108 with first threshold
108 number of missing context release messages
110 cell global identity search algorithm
112 error rate of connection re-establishment messages
114 comparing 112 with second threshold
116 information algorithm
118 central network element
120 base station serving 102 and 103
122 physical cell identities and cell global identities of neighboring base stations
124 receiving 122
126 detailed cell information
128 detecting 130
130 lost connections between a mobile device and a base station of the wireless communication network
132 automatic neighbor relation measurement
134 plurality of cells of the wireless communication network
136 base station serving cell 102
138 base station serving cell 103
140 hotspot of cell 103
142 neighboring cell of cell 102

The invention claimed is:

1. A computer implemented method of operating a base station of a wireless communication network, wherein the method comprises:
comparing a number of missing context release messages with a first criterion;
comparing the error rate of connection reestablishment messages with a second criterion;
executing a cell global identity search algorithm if at least one of the first and the second criterion is fulfilled, wherein the cell global identity of at least one cell with the physical cell identity of the cell where the criterion was fulfilled is requested via an automatic neighbour relation measurement, and wherein a conflict of physical cell identities is detected and reported to an information algorithm when for the physical cell identity at least two cell global identities are found;
informing, via the information algorithm, a central network element and/or at least one base station of the mobile communication network about a conflict of physical cell identities when a conflict of physical cell identities is reported to the information algorithm; and
initiating a reassignment of at least one physical cell identity.

2. The method of claim 1, further comprising:
receiving the physical cell identities and the cell global identities of the cells served by neighbouring base stations at a base station;
reporting the physical cell identities and the cell global identities of the cells served by the base station to at least one neighbouring base station of the wireless communication network;
determining if detailed cell information is required when two different cells with two different cell global identities have the same physical cell identity;
reporting a conflict of physical cell identities to the information algorithm, if no detailed cell information is required;
asking for the detailed cell information, if detailed cell information is required, by sending a message to the base station serving the cell if that detailed cell information is required;
determining based on the detailed cell information, if the cell global identity search algorithm is executed; and
executing the cell global identity search algorithm, if the physical cell identity conflict exists.

3. The method of claim 1, wherein the method further comprises detecting the loss of connections between the base station and a plurality of mobile devices, whereby a loss of connection is detected when no uplink data is received without an initiated handover to a neighbouring base station of the wireless communication network, and wherein a physical cell identity conflict is reported to the information algorithm by the base station when the number of lost connections fulfills a third criterion.

4. The method of claim 1, wherein the method further comprises requesting an automatic neighbour relation measurement, wherein a physical cell identity conflict is reported to the information algorithm by the base station when the same physical cell identity is assigned to two cells with different cell global identities.

5. The method of claim 1, wherein the reassignment of at least one physical cell identity is initiated by the central network element.

6. The method of claim 1, wherein reassignment of at least one physical cell identity is initiated by the base station.

7. The method of claim 1, wherein the base station requests detailed cell information of at least one different base station.

8. The method of claim 1, wherein the base station sends detailed cell information to at least one different base station that has requested the detailed cell information.

9. The method of claim 1, wherein the first criterion is a first threshold of missing context release messages per a time interval.

10. The method of claim 1, wherein the second criterion is a second threshold of the error rate of connection reestablishment messages.

11. The method of claim 1, wherein the third criterion is a fourth threshold of the number of lost connections between the base station and the plurality of mobile devices.

12. The method of claim 1, wherein the central network element is an operation and maintenance node.

13. The method of claim 1, wherein the detailed cell information is information of the size and the position of the cell in terms of coverage area and main antenna lobe orientation.

14. A method implemented by a non-transitory computer readable storage medium, in which a program is saved, the program comprising instructions which, when they are executed in a programmable device, perform the method, the method comprising:
comparing a number of missing context release messages with a first criterion;
comparing the error rate of connection reestablishment messages with a second criterion;

executing a cell global identity search algorithm if at least one of the first and the second criterion is fulfilled, wherein the cell global identity of at least one cell with the physical cell identity of the cell where the criterion was fulfilled is requested via an automatic neighbour relation measurement, and wherein a conflict of physical cell identities is detected and reported to an information algorithm when for the physical cell identity at least two cell global identities are found;

informing, via the information algorithm, a central network element and/or at least one base station of the mobile communication network about a conflict of physical cell identities when a conflict of physical cell identities is reported to the information algorithm; and initiating a reassignment of at least one physical cell identity.

15. A base station apparatus of a wireless communication network, the apparatus comprising at least one processor configured to:

compare a number of missing context release messages with a first criterion;

compare the error rate of connection reestablishment messages with a second criterion;

execute a cell global identity search algorithm if at least one of the first and the second criterion is fulfilled, wherein the cell global identity of at least one cell with the physical cell identity of the cell where the criterion was fulfilled is requested via an automatic neighbour relation measurement, and wherein a conflict of physical cell identities is detected and reported to an information algorithm when for the physical cell identity at least two cell global identities are found;

inform, via the information algorithm, a central network element and/or at least one base station of the mobile communication network about a conflict of physical cell identities when a conflict of physical cell identities is reported to the information algorithm; and initiate a reassignment of at least one physical cell identity.

16. The method of claim 14, the method further comprising:

receiving the physical cell identities and the cell global identities of the cells served by neighbouring base stations at a base station;

reporting the physical cell identities and the cell global identities of the cells served by the base station to at least one neighbouring base station of the wireless communication network;

determining if detailed cell information is required when two different cells with two different cell global identities have the same physical cell identity;

reporting a conflict of physical cell identities to the information algorithm, if no detailed cell information is required;

asking for the detailed cell information, if detailed cell information is required, by sending a message to the base station serving the cell if that detailed cell information is required;

determining based on the detailed cell information, if the cell global identity search algorithm is executed; and executing the cell global identity search algorithm, if the physical cell identity conflict exists.

17. The method of claim 16, wherein the method further comprises detecting the loss of connections between the base station and a plurality of mobile devices, whereby a loss of connection is detected when no uplink data is received without an initiated handover to a neighbouring base station of the wireless communication network, and wherein a physical cell identity conflict is reported to the information algorithm by the base station when the number of lost connections fulfills a third criterion.

18. The apparatus of claim 15, the at least one processor of the apparatus being further configured to:

receive the physical cell identities and the cell global identities of the cells served by neighbouring base stations at a base station;

report the physical cell identities and the cell global identities of the cells served by the base station to at least one neighbouring base station of the wireless communication network;

determine if detailed cell information is required when two different cells with two different cell global identities have the same physical cell identity;

report a conflict of physical cell identities to the information algorithm, if no detailed cell information is required;

ask for the detailed cell information, if detailed cell information is required, by sending a message to the base station serving the cell if that detailed cell information is required;

determine based on the detailed cell information, if the cell global identity search algorithm is executed; and execute the cell global identity search algorithm, if the physical cell identity conflict exists.

19. The apparatus of claim 18, wherein the at least one processor of the apparatus is further configured to detect the loss of connections between the base station and a plurality of mobile devices, whereby a loss of connection is detected when no uplink data is received without an initiated handover to a neighbouring base station of the wireless communication network, and wherein a physical cell identity conflict is reported to the information algorithm by the base station when the number of lost connections fulfills a third criterion.

20. The apparatus of claim 19, wherein the at least one processor of the apparatus is further configured to request an automatic neighbour relation measurement, wherein a physical cell identity conflict is reported to the information algorithm by the base station when the same physical cell identity is assigned to two cells with different cell global identities.

* * * * *